United States Patent
Sei et al.

(10) Patent No.: US 6,637,913 B2
(45) Date of Patent: Oct. 28, 2003

(54) PORTABLE LIGHT SOURCE APPARATUS

(75) Inventors: Yujiro Sei, Hamamatsu (JP); Masaki Ito, Hamamatsu (JP)

(73) Assignee: Hamamatsu Photonics K.K., Shizuoka (JP)

(*) Notice: Subject to any disclaimer, the term of this patent is extended or adjusted under 35 U.S.C. 154(b) by 95 days.

(21) Appl. No.: 09/984,028

(22) Filed: Oct. 26, 2001

(65) Prior Publication Data

US 2002/0054493 A1 May 9, 2002

Related U.S. Application Data

(63) Continuation-in-part of application No. PCT/JP00/02845, filed on Apr. 28, 2000.

(30) Foreign Application Priority Data

Apr. 28, 1999 (JP) .......................................... 11-122998

(51) Int. Cl.⁷ .............................................. F21V 29/02
(52) U.S. Cl. ...................... 362/373; 362/294; 362/263; 362/264; 362/551; 362/558
(58) Field of Search ............................... 362/362, 373, 362/294, 551, 558, 263, 264

(56) References Cited

U.S. PATENT DOCUMENTS

| | | | |
|---|---|---|---|
| 4,572,164 A | * 2/1986 | Yoshida et al. | |
| 5,066,012 A | * 11/1991 | Stark | 273/65 EF |
| 5,552,669 A | 9/1996 | Ikedo et al. | 313/613 |
| 5,587,625 A | 12/1996 | Ikedo et al. | 313/613 |
| 5,619,101 A | 4/1997 | Ikedo et al. | 313/581 |
| 5,633,563 A | 5/1997 | Ikedo et al. | 313/614 |
| 5,646,487 A | 7/1997 | Ikedo et al. | 315/94 |
| 5,684,363 A | 11/1997 | Ikedo et al. | 313/613 |
| 5,698,945 A | 12/1997 | Ikedo et al. | 313/613 |
| 6,454,441 B1 | * 9/2002 | Lin | 362/294 |

FOREIGN PATENT DOCUMENTS

| | | |
|---|---|---|
| JP | 57-165811 | 10/1982 |
| JP | 2-276927 | 11/1990 |
| JP | 8-222186 | 8/1996 |
| JP | 8-233659 | 9/1996 |
| JP | 8-329732 | 12/1996 |
| JP | 9-27213 | 1/1997 |
| JP | 2561305 | 10/1997 |

* cited by examiner

*Primary Examiner*—Laura K. Tso
(74) *Attorney, Agent, or Firm*—Morgan, Lewis & Bockius LLP

(57) ABSTRACT

This portable light source apparatus accommodates a deuterium lamp in a lamp box and, at the same time, in a housing in order for the influence of temperature changes in the outside air to become very small. Namely, the deuterium lamp, which is susceptible to changes in temperature, is enveloped not only by the lamp box but also by the housing, thereby being accommodated in a double shield structure. Further, it has been known that ozone is generated when ultraviolet rays are emitted in the air. Therefore, a light guide tube for extending a light exit opening of the lamp box is provided, so that cooling winds do not traverse the ultraviolet rays. As a result, ozone is restrained from occurring in the part where the ultraviolet rays occur within the housing, whereby the emitted light is appropriately kept from fluctuating due to the occurrence of ozone.

16 Claims, 13 Drawing Sheets

PORTABLE LIGHT SOURCE APPARATUS

RELATED APPLICATION

This is a continuation-in-part application of application Ser. No. PCT/JP00/02845 filed on Apr. 28, 2000, now pending.

BACKGROUND OF THE INVENTION

1. Field of the Invention

The present invention relates to a portable light source apparatus which can be brought into work sites.

2. Related Background Art

Conventionally known as a technique in such a field is Japanese Patent Application Laid-Open No. HEI 8-329732. The light source apparatus disclosed in this publication has means for cooling a deuterium lamp. Namely, the deuterium lamp is accommodated in a light source block, whereas a vent hole formed in the light source block and a cooling fan are connected to each other by an air duct, so that cooling winds sent out from the cooling fan pass through the light source block, thereby indirectly cooling the deuterium lamp.

SUMMARY OF THE INVENTION

However, though the above-mentioned conventional light source apparatus is contrived such that the deuterium lamp is cooled with cooling winds, the deuterium lamp does not operate stably when simply cooled and may not achieve a desirable stability of output when cooled in excess. This results from the structure of the deuterium lamp, which maintains a low pressure state of $1/100$ atm or so therewithin, thus having a characteristic which is quite easily affected by temperature changes in the outside air. Conventionally, while the deuterium lamp is accommodated in the light source block, the light source block is utilized so as to be directly in contact with the outside air, whereby the deuterium lamp is quite susceptible to changes in the outside temperature in work sites, thus leaving a problem that it is difficult for the deuterium lamp to attain a stable output characteristic.

Japanese Patent Application Laid-Open No. HEI 8-233659 discloses means for directly cooling a deuterium lamp while in a state where the deuterium lamp is accommodated in a light source chamber. Japanese Patent Application Laid-Open HEI 9-27213 discloses one in which a xenon lamp, which does not require such minute temperature control as that in the deuterium lamp, is accommodated in a lamp house and is indirectly cooled by a cooling fan. Japanese Patent Application Laid-Open No. SHO 57-165811 discloses a light source apparatus configured such that a condenser lens is blown with cool outside air immediately after the lamp is lit. Japanese Utility Model Registration No. 2561305 discloses a detachable light source unit (lens barrel) in a light source apparatus.

In order to overcome the problems mentioned above, it is an object of the present invention to provide a portable light source apparatus which, in particular, is less likely to be affected by temperature changes in the outside air, so as to attain a very high stability in output.

This portable light source apparatus comprises a lamp box, secured within a housing, accommodating a deuterium lamp for generating a predetermined wavelength of light, and having a light exit opening for letting out the light emitted from the deuterium lamp; a power unit, secured within the housing, for driving the deuterium lamp; a cooling fan, secured to the housing, for generating a forcible air flow within the housing; and a light guide tube secured to the lamp box so as to extend the light exit opening of the lamp box.

This portable light source apparatus is an apparatus for lighting/blinking a deuterium lamp. The deuterium lamp does not operate stably when simply cooled. This is because of the fact that the deuterium lamp maintains a low pressure state (e.g., about $1/100$ atm) therewithin, thereby exhibiting an output characteristic which is quite susceptible to temperature changes. Therefore, such a deuterium lamp is accommodated in a lamp box and, at the same time, in a housing in order for the influence of temperature changes in the outside air to become very small. Namely, the deuterium lamp, which is susceptible to changes in temperature, is enveloped not only by the lamp box but also by the housing, thereby being accommodated in a double shield structure. Further, it has been known that ozone is generated when ultraviolet rays are emitted in the air. Therefore, in the present invention, the light guide tube for extending the light exit opening of the lamp box is provided, so that cooling winds do not traverse the ultraviolet rays. As a result, ozone is restrained from occurring in the part where the ultraviolet rays occur within the housing, whereby the emitted light is appropriately kept from fluctuating due to the occurrence of ozone.

Preferably, in the portable light source apparatus, a condenser lens is disposed within the light exit opening of the lamp box. When such a configuration is employed, the condenser lens can be built in appropriately and can be arranged so as to approach the deuterium lamp, so that a larger amount of light can be collected, whereby the light intensity increases.

Preferably, in the portable light source apparatus, the condenser lens is held and secured between the light guide tube and the lamp box. Such a configuration makes it easier to mount a condenser lens matching characteristics of the deuterium lamp, thereby enhancing the efficiency in operations and the degree of freedom in choosing condenser lenses.

Preferably, in the portable light source apparatus, the condenser lens is disposed within an extended opening of the light guide tube. When such a configuration is employed, the condenser lens can be built in appropriately and can be arranged so as to approach the deuterium lamp, so that a larger amount of light can be collected, whereby the light intensity increases.

Preferably, in the portable light source apparatus, the rear end of an adapter for an optical connector is inserted into the extended opening of the light guide tube from the front end side thereof such that the front end of the adapter is exposed from the housing. In this case, the adapter for the optical connector makes it easier to carry out optical connections in the outside of the housing, whereas a structure in which the ultraviolet rays are very hard to be influenced by cooling winds is attained within the housing, whereby optical output characteristics can be stabilized quite highly.

DESCRIPTION OF THE PREFERRED EMBODIMENT

Embodiments of the present invention will be explained with reference to the drawings. In the explanation of the drawings, constituents identical to each other will be referred to with numerals or letters identical to each other without repeating their overlapping descriptions.

Figure 1:
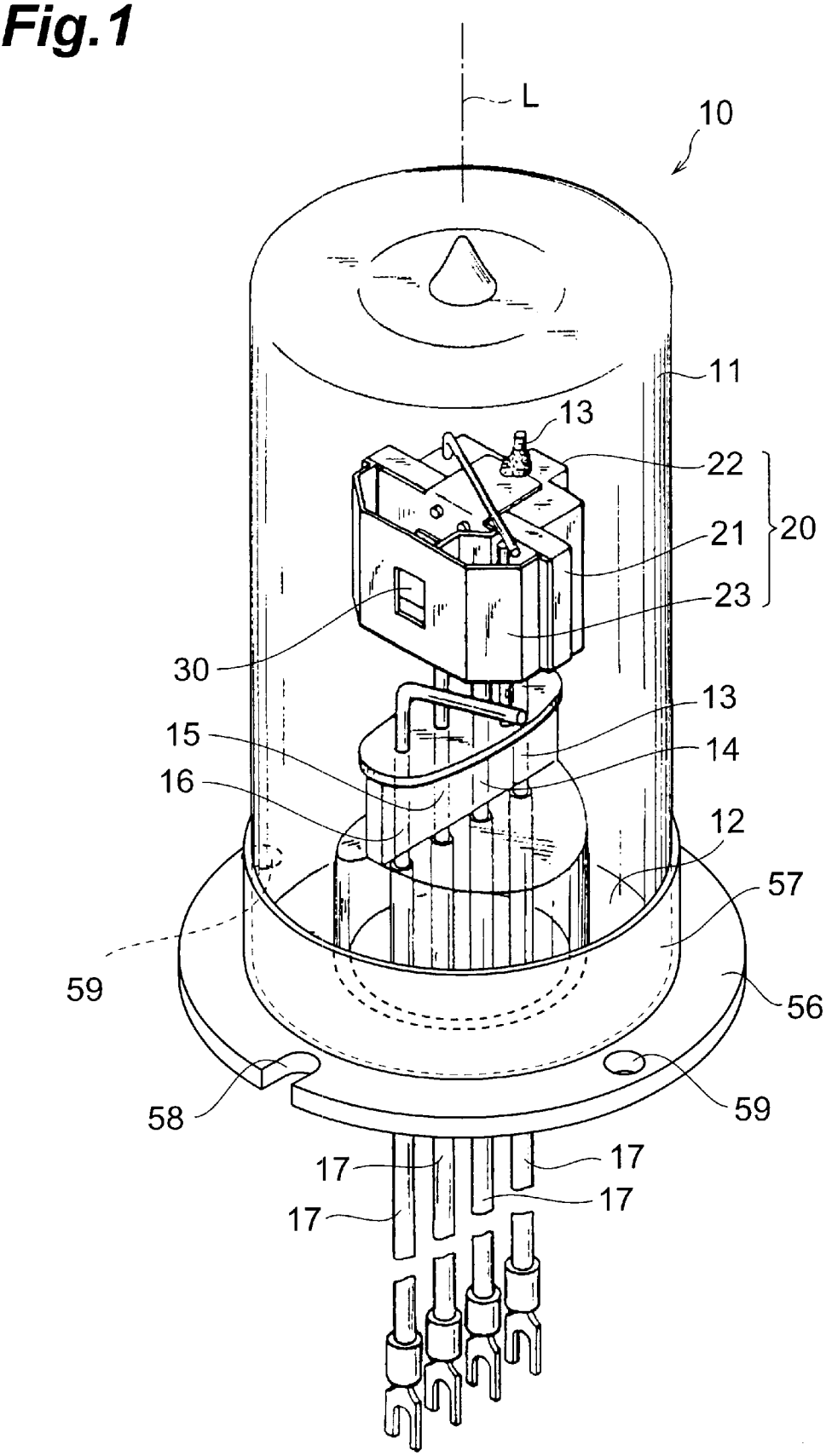
FIG. 1 is a perspective view showing an embodiment of the deuterium lamp employed in a portable light source apparatus.

FIG. 1 is a perspective view showing a deuterium lamp employed in the portable light source apparatus in accordance with the present invention. The deuterium lamp 10 shown in this drawing is known as a side-on type in which ultraviolet rays are emitted from a side thereof. In this deuterium discharge tube 10, a light-emitting unit assembly 20 is accommodated within a cylindrical envelope 11 made of glass, whereas about several Torr of deuterium gas (not depicted) are encapsulated therein. Formed at the bottom of the envelope 11 is a stem 12 made of glass. The envelope 11 is formed from UV-transmitting glass, silica glass, or the like having a favorable UV transmissivity.

In the stem 12, four lead pins 13 to 16 are arranged and secured in parallel in a row, whereas each of the lead pins 13 to 16 penetrates through the stem 12 and is coated with an insulating material so as to be drawn out as a lead 17, which is connected to an external power supply (not depicted). The light-emitting unit assembly 20 has a front face cover 23 made of a metal (Ni or SUS) or ceramics, which is disposed in a front part; an anode support member 22 made of ceramics, which is disposed in a rear part; and a focusing electrode support member 21 made of a metal (Ni or SUS), which is disposed between the anode support member 22 and the front face cover 23.

The configuration of the light-emitting unit assembly 20 will now be explained in detail.

Figure 2:
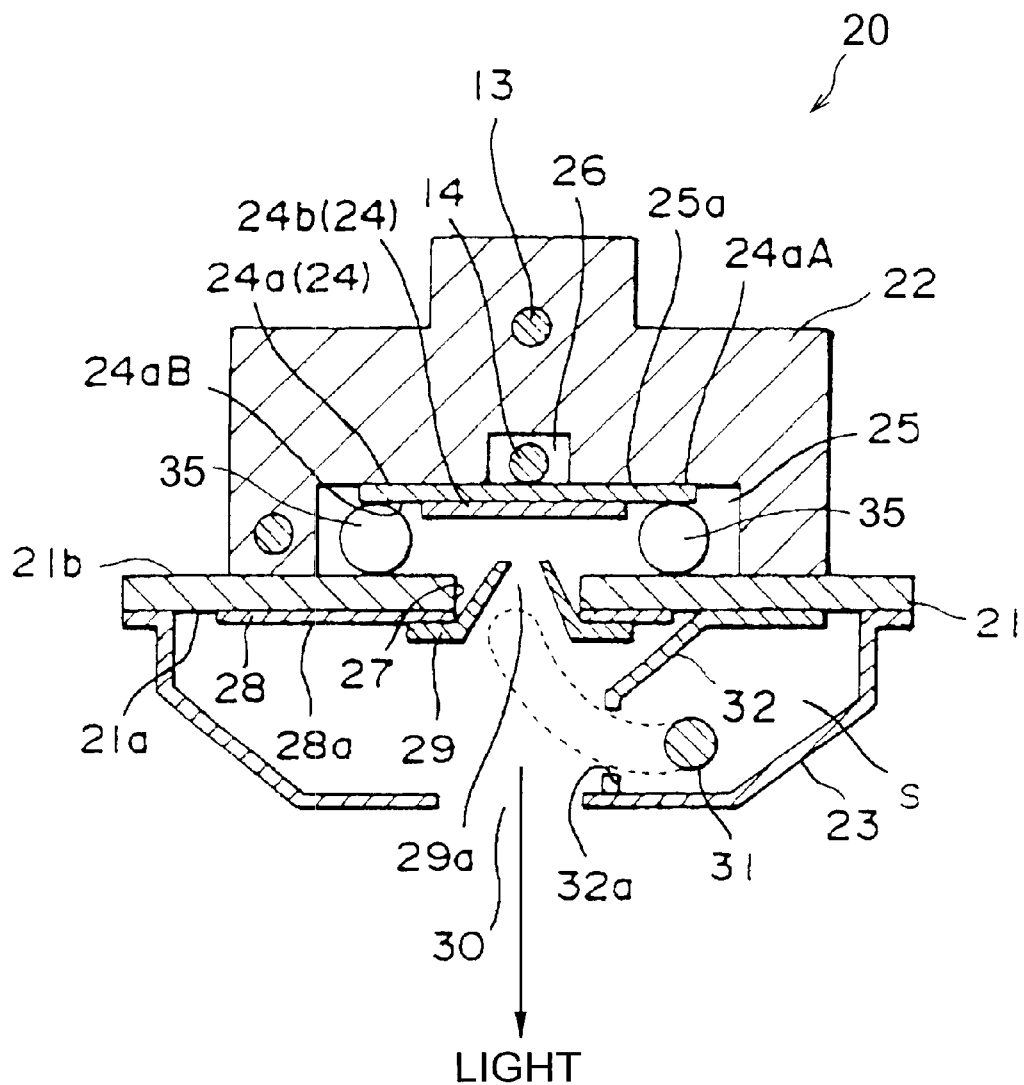
FIG. 2 is a transverse sectional view of FIG. 1.

As shown in FIGS. 1 and 2, an anode unit 24 made of a metal is secured to the leading end of the lead pin 14. The anode unit 24 is constituted by a rectangular anode fixing plate 24a secured to the leading end of the lead pin 14, and a sheet-like anode 24b secured to the front face 24aB of the anode fixing plate 24a. Formed in front of the anode support member 22 shaped like a column having a substantially T-like cross section are an anode accommodating recess 25 for accommodating the anode fixing plate 24a, and a lead pin accommodating recess 26 for accommodating the leading end part of the lead pin 14 positioned behind the anode unit 24. Therefore, when the lead pin 14 is accommodated in the lead pin accommodating recess 26 while in a state where the anode unit 24 is secured to the lead pin 14, the anode support member 22 can be held within the envelope 11 by the lead pin 14. The rear face 24aA of the anode fixing plate 24a abuts against the bottom face 25a of the anode accommodating recess 25 so as to be supported thereby.

The anode support member 22 is integrally formed from ceramics having an electrically insulating property and a high thermal conductivity. Therefore, the anode support member 22 can act as a heat sink with respect to the anode unit 24 at a high temperature, thereby efficiently emanating the heat accumulated in the light-emitting unit assembly 20 to the outside.

The sheet-like focusing electrode support member 21 disposed in front of the anode unit 22 is formed with a rectangular opening part 27 which is located at a position opposing the anode 24b. Further, a focusing electrode fixing plate 28 made of a metal is disposed in contact with the focusing electrode support member 21. A focusing electrode unit 29 made of a metal is secured to the front face 28a of the focusing electrode fixing plate 28. The focusing electrode fixing plate 28 is secured to the front face 21a of the focusing electrode support member 21, whereas a focusing opening 29a of the focusing electrode unit 29 faces to the opening part 27 of the focusing electrode support member 21 and opposes the anode 24b.

The front face cover 23 is formed so as to have a substantially U-shaped cross section, and is secured to the front face 21a of the focusing electrode support member 21. Formed at the center of the front face cover 23 is an opening window 30 for projecting ultraviolet rays, which opposes the focusing opening 29a and the anode 24b. Disposed within a space S formed by the front face cover 23 and the focusing electrode support member 21 is a spiral hot cathode 31 for generating thermions. The hot cathode 31 is disposed at a position shifted from the optical path, i.e., at a side portion within the front face cover 23.

Between the hot cathode 31 and the focusing electrode unit 29, a discharge current plate 32 made of a metal (Ni or SUS) or ceramics is disposed at a position shifted from the optical path. One end of the discharge current plate 32 is secured to the front face 21a of the focusing electrode support member 21, whereas the other end abuts against the inner wall face of the front face cover 23. Also, the discharge current plate 32 is formed with a slit 32a which communicates the hot cathode 31 and the focusing electrode unit 29 to each other, thereby shaping the current of the thermions generated from the hot cathode 31.

Two cylindrical spacers 35 made of ceramics are disposed between the focusing electrode support member 21 and the anode fixing plate 24b of the anode unit 24. The spacers 35 are disposed at respective positions on both sides within the anode accommodating recess 25 so as to abut against the back face 21b of the focusing electrode support member 21 and the front face 24aB of the anode fixing plate 24a. By use of the spacers 35, the gap between the focusing electrode unit 29 and the anode unit 24 can always be held constant.

Actions of the above-mentioned side-on type deuterium discharge tube 10 will now be explained.

First, during a period of about 20 seconds before discharging, a power of about 10 W is supplied from an external power supply (not depicted) to the hot cathode 31, so as to preheat the latter. Thereafter, an AC open voltage of about 150 V is applied between the hot cathode 31 and the anode 24b, so as to prepare for arc discharge.

After the preparation, a trigger voltage of 350 to 500 V is applied between the hot cathode 31 and the anode 24b. At this time, the thermions emitted from the hot cathode 31 pass through the elongated slit 32a of the discharge current plate 32, so as to reach the anode 24b while being converged by the focusing opening 29a of the focusing electrode unit 29. Subsequently, arc discharge occurs in front of the focusing opening 29a, and ultraviolet rays taken out from arc balls caused by the arch discharge pass through the opening window 30 and then are transmitted through the peripheral face of the envelope 11 made of glass, so as to be emitted to the outside.

Since the anode unit 24 and anode support member 29 attain a high temperature exceeding several hundred ° C., this heat is emitted to the outside by the above-mentioned members made of ceramics when appropriate. Since the anode unit 24 and the focusing electrode unit 29 are firmly held by the anode support member 22 and the focusing electrode support member 21, respectively, they are hard to deform even at a high temperature caused by continuous light emission over a long period of time, whereby the positional accuracy between the anode unit 24 and the focusing electrode unit 29 can be held favorably.

A portable light source apparatus utilizing the above-mentioned deuterium lamp 10 will now be explained.

Figure 3:
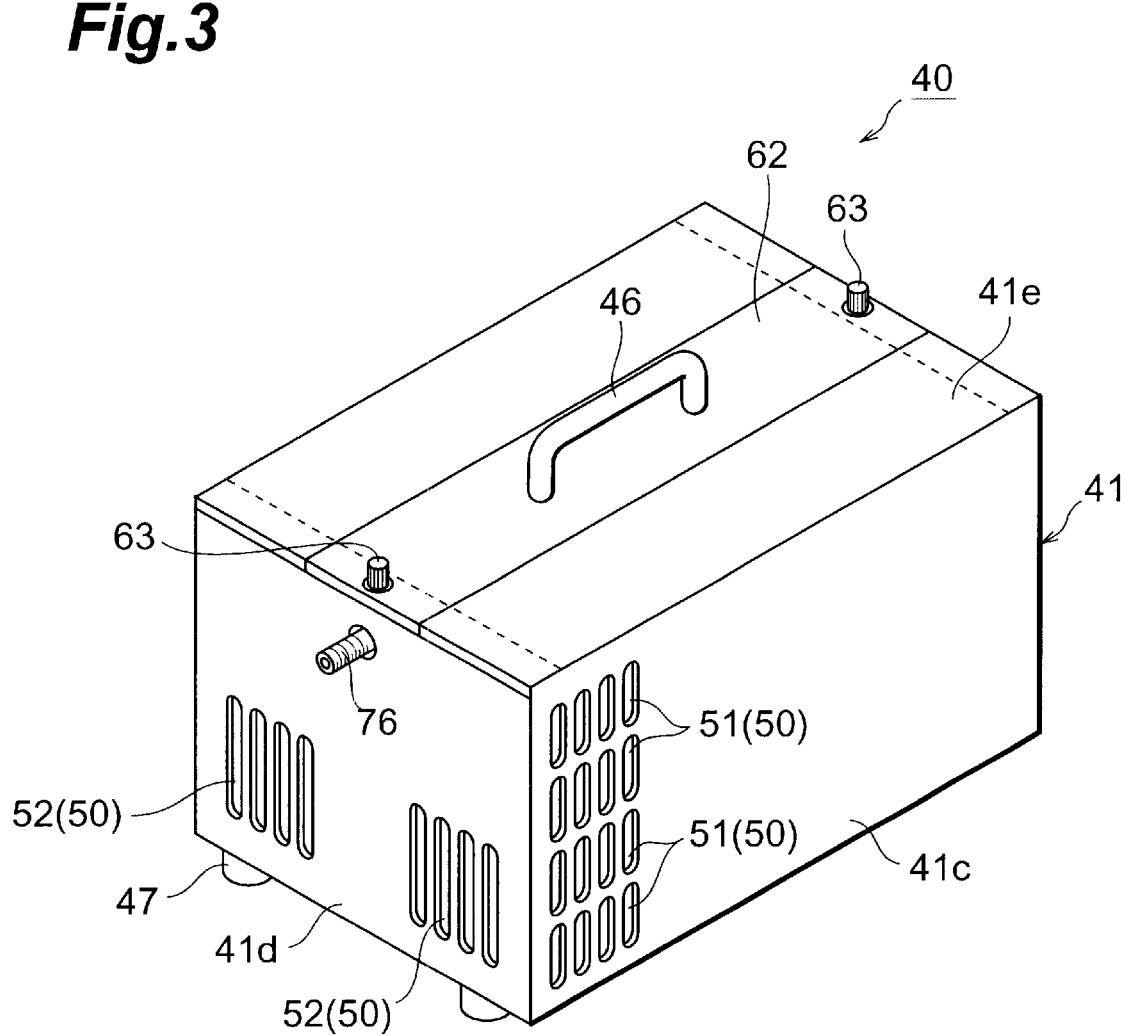
FIG. 3 is a perspective-view showing an embodiment of the portable light source apparatus in accordance with the present invention.
Figure 4:
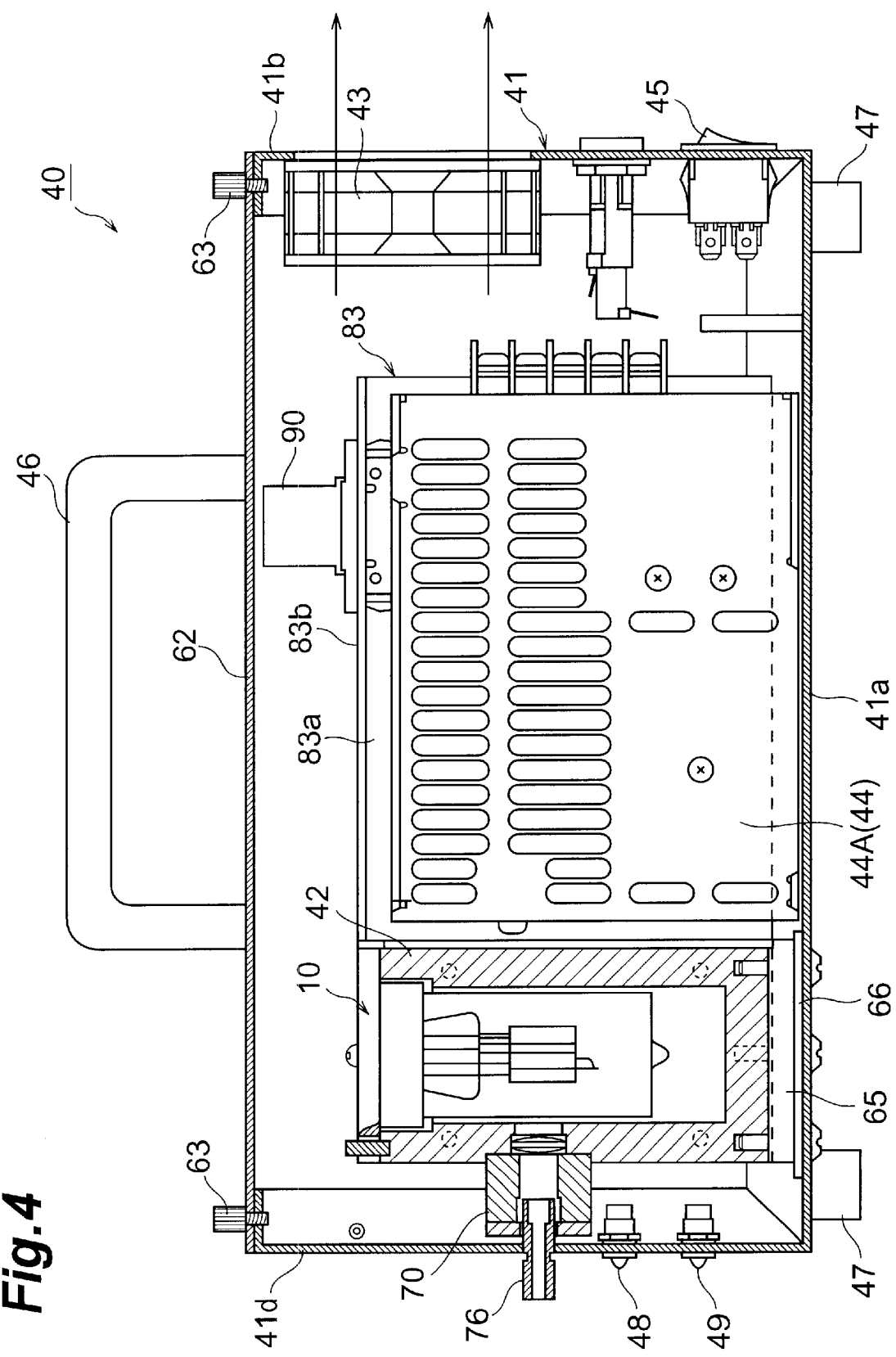
FIG. 4 is a sectional view of the light source apparatus shown in FIG. 3.
Figure 5:
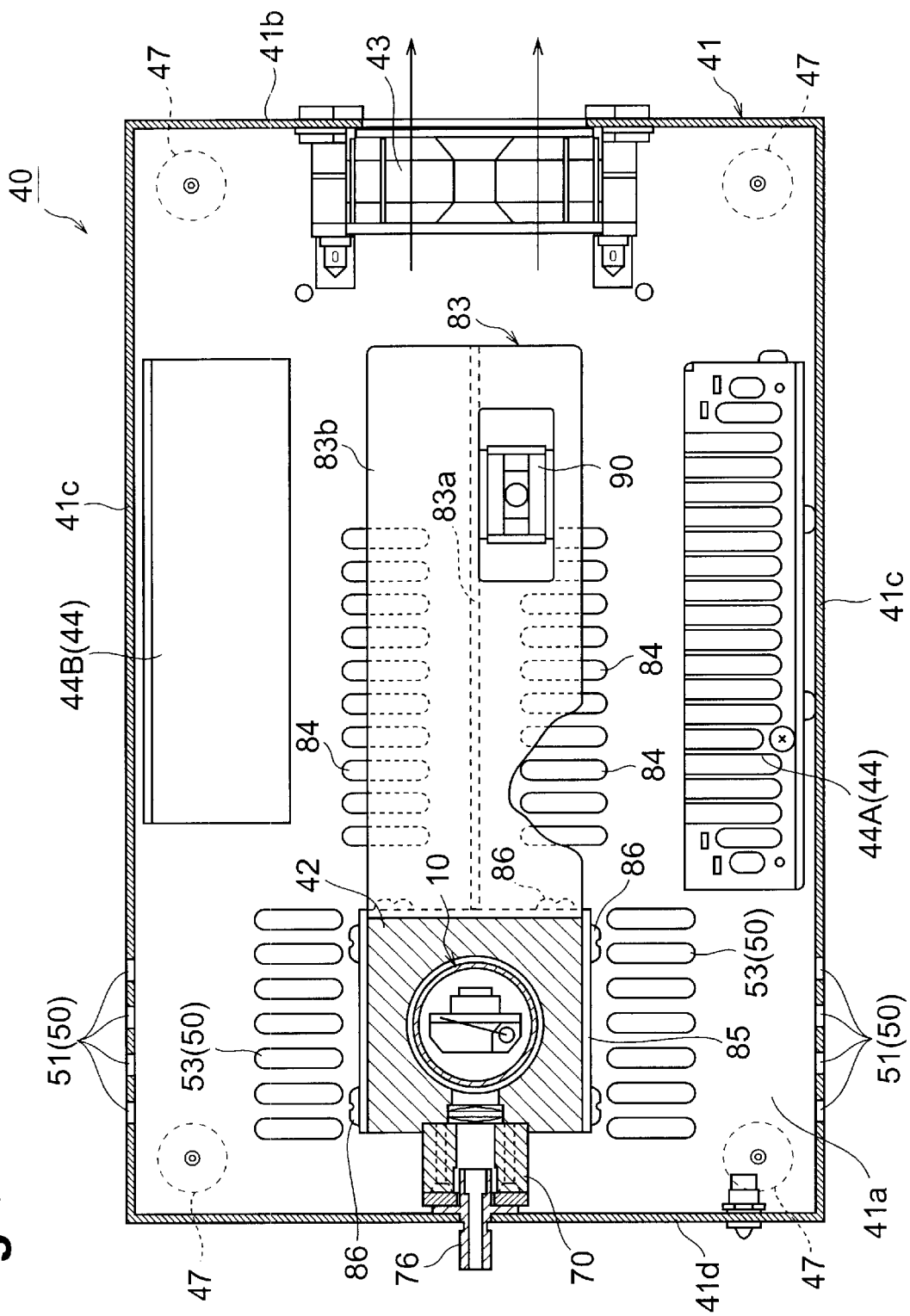
FIG. 5 is a sectional view of the light source apparatus shown in FIG. 3.

As shown in FIGS. 3 to 5, a light source apparatus 40 is a very compact, lightweight, easy-to-carry apparatus having a length of about 26 cm, a width of about 16 cm, a height of about 12 cm, and a weight of about 3 kg. The light source apparatus 40 has a housing 41, made of steel, having a rectangular parallelepiped form. Within the housing 41, a lamp box 42 made of aluminum for accommodating the deuterium lamp 10 is secured to a bottom faceplate 41a in a front part, whereas a cooling fan 43 for producing a forcible flow of air within the housing 41 is secured to a back faceplate 41b in a rear part.

Between the lamp box 42 and the cooling fan 43, a power unit 44 is secured to the bottom faceplate 41a, whereas the power unit 44 is divided into left and right parts by an AC/DC converter 44A and a lamp driving power circuit 44B. When a power switch 45 disposed at the back faceplate 41b of the housing 41 is turned ON, a desirable current is supplied to the deuterium lamp 10 by way of the power unit 44, whereby the cooling fan 43 starts rotating.

In view of the carrying and handling outdoors and indoors, a handle 46 and rubber-made legs 47 are attached to the light source apparatus 40. Also, the housing 41 is provided with an LED lamp 48 for indicating the ON/OFF of the power, and an LED lamp 49 for indicating the ON/OFF of the deuterium lamp 10 in order to improve the convenience of operators.

Thus, the portable light source apparatus 40 is an apparatus for lighting/blinking the deuterium lamp 10. Meanwhile, the deuterium lamp 10 does not operate stably when simply cooled. This is because of the fact that the deuterium lamp 10 maintains a low pressure state (e.g., about 1/100 atm) therewithin, thus having an output characteristic which is quite susceptible to temperature changes.

Hence, such a deuterium lamp 10 is accommodated in the lamp box 42 and, at the same time, in the housing 41 in order for the influence of temperature changes in the outside air to become very small. Namely, the deuterium lamp 10 is enveloped not only by the lamp 42 but also by the housing 41, thereby being accommodated in a double shield structure. As a result, the temperature change of the housing 41, which is the most likely to be affected by the outside air, is harder to be transmitted to the deuterium lamp 10, whereby the latter can be utilized for a long period of time without taking account of the changes in weather during outdoor operations or influences of air conditioners and the like during indoor operations.

In addition to the contrivances mentioned above, the light source apparatus 40 in accordance with the present invention is provided with other contrivances at various places thereof so as to cause the high-performance deuterium lamp 10 to fully exhibit its characteristics. These contrivances will now be explained.

The housing 41 is formed with intake holes 50 for enabling the cooling fan 43 disposed on the rear side to appropriately aspirate air and generate a suitable cooling wind within the housing 41. The intake holes 50 are positioned in front of the power unit 44 while being laterally symmetrical to each other about a line connecting the lamp box 42 and the cooling fan 43. As specific sites in the housing 41, the left and right side faceplates 41c are formed with side intake holes 51 constituted by a plurality of slits opposing the lamp box 42 (see FIGS. 3 and 5), a front faceplate 41d is formed with front intake holes 52 constituted by a plurality of slits on the left and right sides (see FIG. 3), and the bottom faceplate 41a is formed with bottom intake holes 53 constituted by a plurality of slits positioned on both flanks of the lamp box 42 (see FIG. 5).

Since the intake holes 51, 52, 53 are thus positioned in front of the power unit 44, they appropriately cool the latter. Therefore, a stable voltage can be supplied to the deuterium lamp 10, thus making it possible to cause the output characteristic of the deuterium lamp 10 to become quite stable in combination with the above-mentioned double shield structure.

Also, since each set of the intake holes 51, 52, 53 are formed at positions laterally symmetrical to each other, laterally symmetrical cooling winds can be generated within the housing 41 from the left and right intake holes 50 to the cooling fan 43. As a consequence, the lamp box 42 can be cooled laterally symmetrically, so that the output characteristic of the deuterium lamp 10 can further be stabilized. If the amount of air intake is sufficient, the side intake holes 51 and front intake holes 52 may be eliminated so as to leave the bottom intake holes 53, thereby simplifying the exterior. In this case, dust and dirt are appropriately prevented from entering from the outside.

Figure 6:
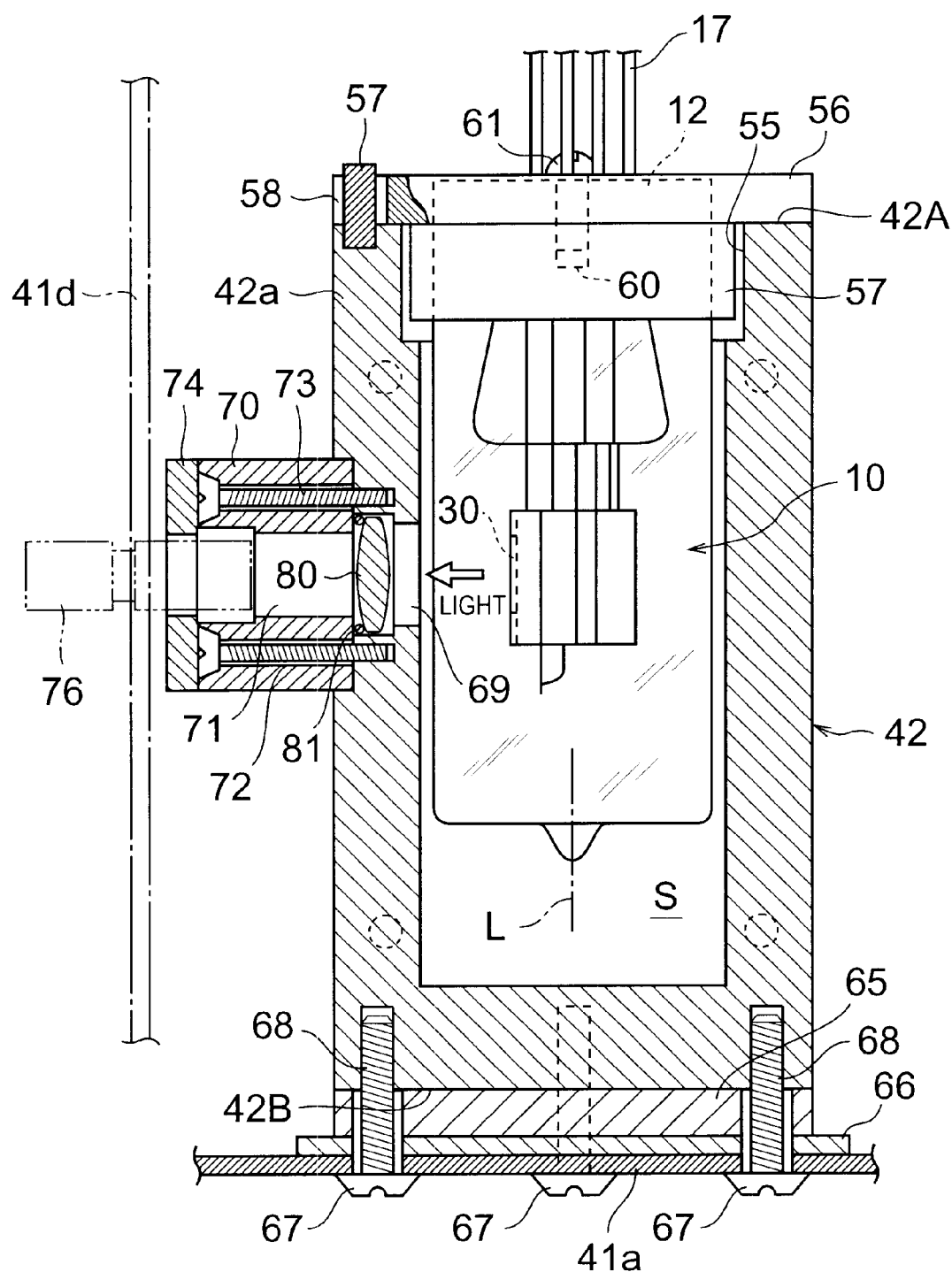
FIG. 6 is an enlarged sectional view showing a state where a deuterium lamp is mounted within a lamp box.
Figure 7:
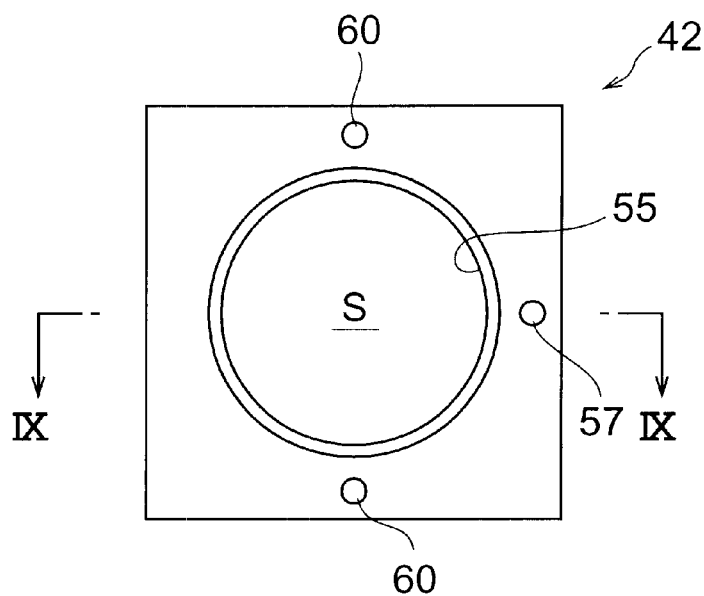
FIG. 7 is a plan view of the lamp box.
Figure 8:
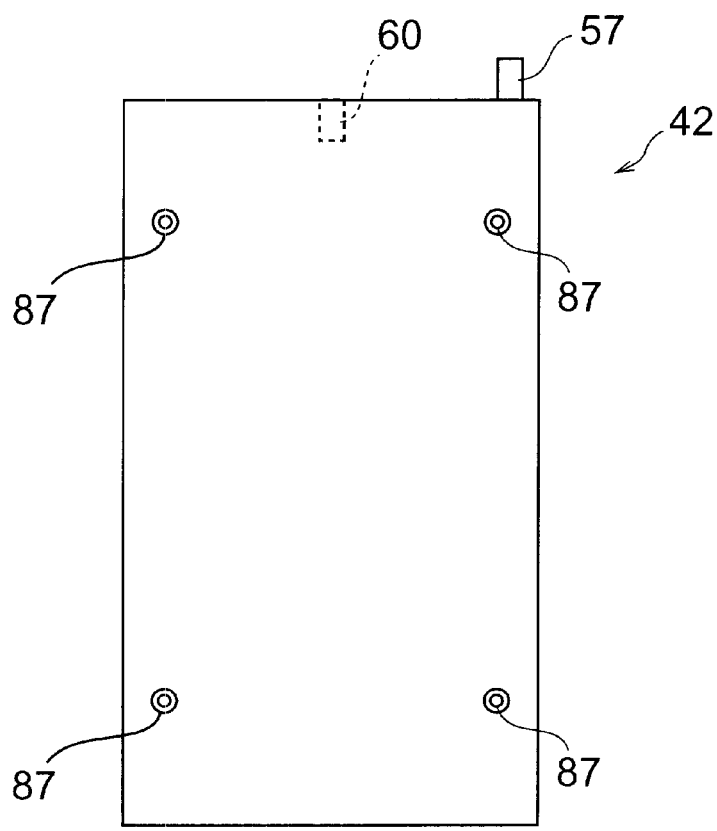
FIG. 8 is a side view of the lamp box.
Figure 9:
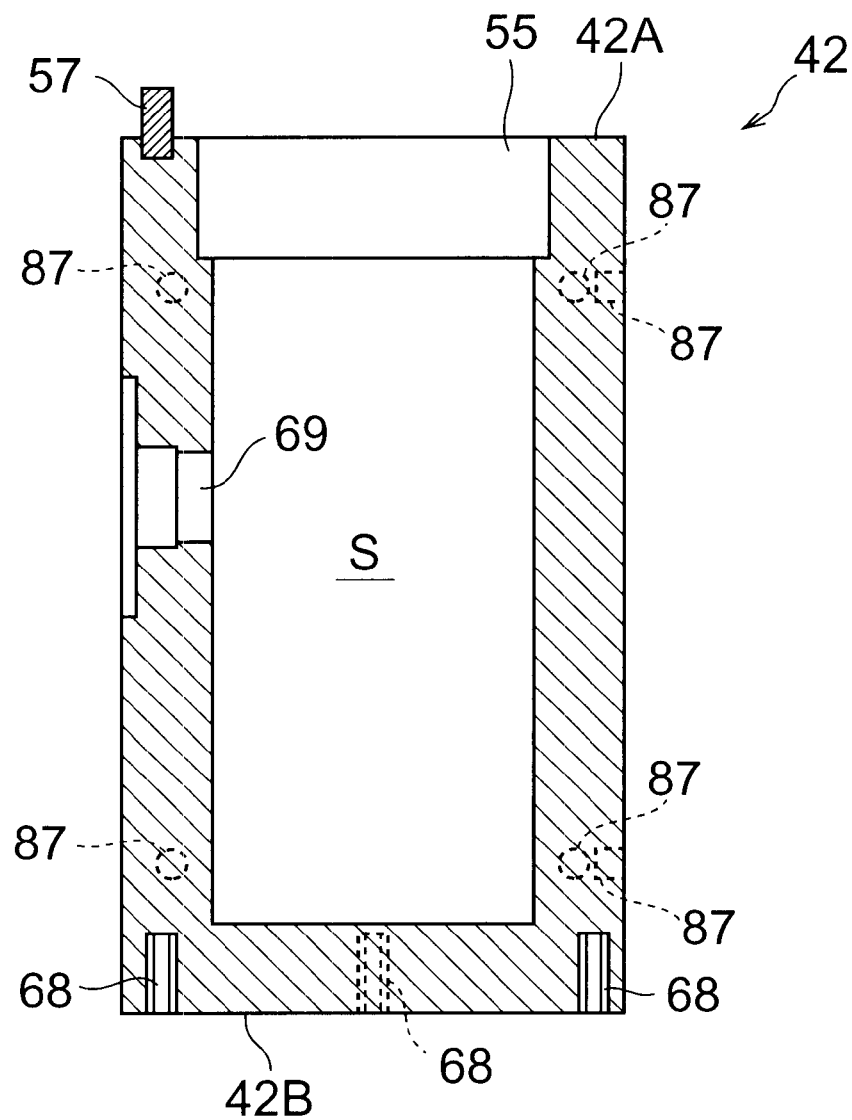
FIG. 9 is a sectional view taken along the line IX—IX of FIG. 7.
Figure 10:
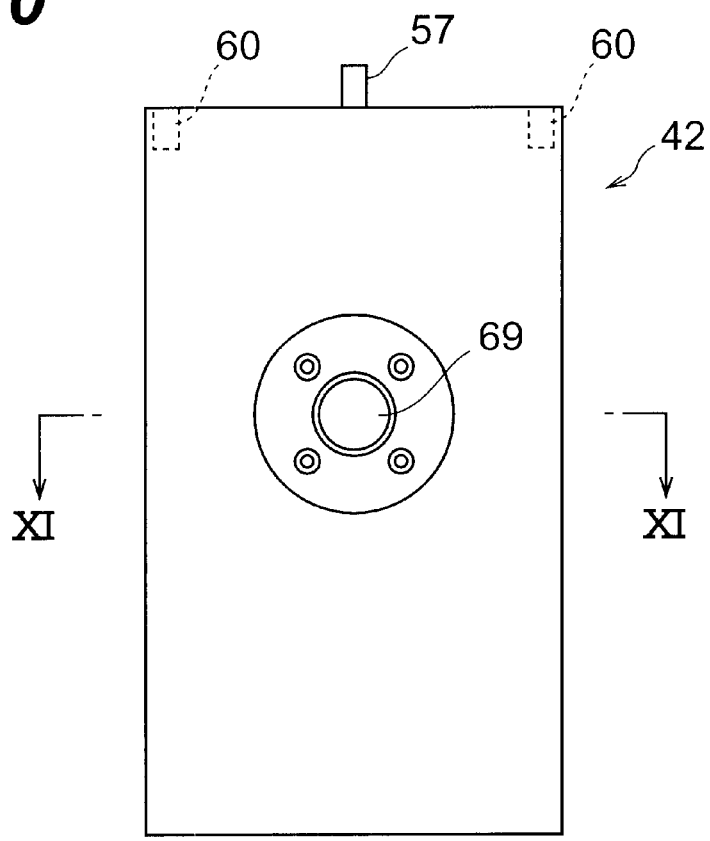
FIG. 10 is a front view of the lamp box.
Figure 11:
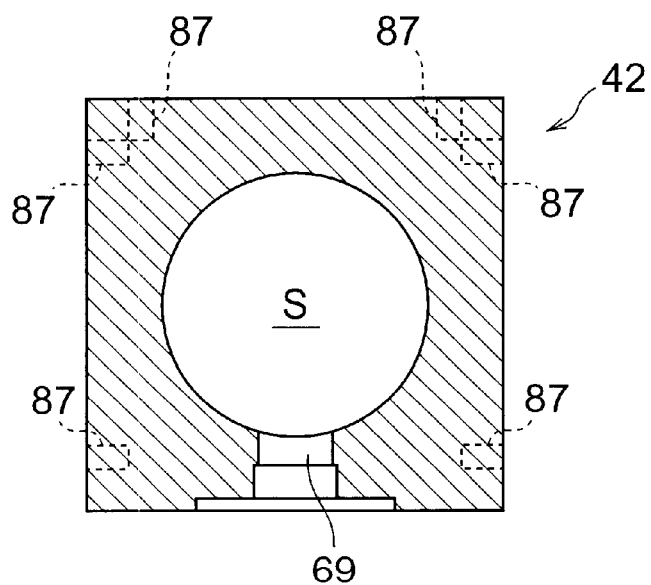
FIG. 11 is a sectional view taken along the line XI—XI of FIG. 10.

As shown in FIG. 6, the lamp box 42 secured within the housing 41 is formed into a rectangular parallelepiped from a hollow block made of aluminum in view of thermal conduction. In the lamp box 42, the deuterium lamp 10 is inserted into the cylindrical lamp accommodating space S from thereabove while in a state where its stem 12 side is oriented upward. Since the leads 17 are located on the upper side, operations for connecting them to respective terminals become easier within the housing 41. Also, at the time of replacing the lamp, the operation can be carried out such that the opening 55 for inserting the lamp in the lamp box 42 is looked into from thereabove, whereby the lamp 10, which is likely to break, can be replaced safely.

As shown in FIGS. 7 to 11, the circular lamp insertion opening 55 is formed at the top part of the lamp box 42, whereas the lamp box 42 has the lamp accommodating space S having a diameter greater than that of the glass-made envelope 11 of the deuterium lamp 10. The wall face of the lamp accommodating space S and the surface of the envelope 11 are slightly separated from each other in view of the difference in thermal expansion between their respective materials.

Here, as shown in FIGS. 1 and 6, a flange part 56 made of a metal is secured to the deuterium lamp 10 by an adhesive or the like in order to facilitate the mounting thereof to the lamp box 42. From an end part of a tubular barrel 57 surrounding the stem 12 side of the deuterium lamp 10, the flange part 56 projects in a direction perpendicular to the tubular axis L of the lamp 10. Since such a flange part 56 is provided, the operation for replacing the lamp can be carried out while the flange part 56 is picked up by fingers, so that no fingers come into contact with the glass part of the envelope 11, whereby the luminance can be prevented from becoming uneven due to smudges such as fingerprints.

The flange part 56 abuts against the upper end 42A of the lamp box 42. As a result, the deuterium lamp 10 can easily be accommodated in the lamp box 42 while in a suspended state. Also, since the lamp box 42 and the flange part 56 of the deuterium lamp 10 abut against each other, the flange part 56 provides an appropriate lid for the lamp accommodating space S, whereby cooling winds can appropriately be prevented from entering the lamp accommodating space S.

Further, it is necessary that the mounting position of the deuterium lamp 10 be made constant within the lamp box 42. Therefore, a positioning pin 57 projects from the upper end 42A of the lamp box 42, so as to be inserted into a cutout groove 58 of the flange part 56. Consequently, the lamp replacing operation can be carried out securely without mistaking the front and rear of the deuterium lamp 10 for each other.

For securing the deuterium lamp 10 to the lamp box 42, the flange part 56 is formed with screw insertion holes 59, whereas the upper end 42A of the lamp box 42 is formed with screw holes 60 (see FIGS. 7 and 8) corresponding to the screw insertion holes 59. Hence, when screws 61 are threaded into their corresponding screw holes 62 by way of the screw insertion holes 59, the flange part 56 is firmly secured to the lamp box 42.

For facilitating the lamp replacing operation, the housing 41 is provided with a detachable upper lid 62 facing to the lamp insertion opening 55 of the lamp box 42 as shown in FIGS. 3 and 4. The upper lid 62 can be opened and closed upon attaching and detaching roulette screws 63. When such an upper lid 62 is employed, the upper lid 62 can easily be removed during the lamp replacing operation, so that the operation can be carried out while the lamp box 42 is looked into from thereabove, whereby the lamp 10, which is easy to break, can be replaced safely.

Means for always keeping the deuterium lamp 10, which is quite susceptible to temperature changes, at a constant output characteristic will now be explained. As shown in FIGS. 4 and 6, the lamp box 42 is secured so as to be separated from the bottom faceplate 41a of the housing 41. Specifically, a sheet-like heat insulating member (first heat insulating plate) 65 made of ceramics is inserted between the bottom faceplate 41a and the bottom face 42B of the lamp box 42. As a result, the housing 41 directly in contact with the outside air and the lamp box 42 directly accommodating the deuterium lamp 10 are thermally insulated from each other, whereby temperature changes in the housing 41 are harder to be transmitted to the lamp box 42.

Therefore, the lamp box 42 is thermally insulated from the housing 41, which is the most likely to be affected by temperature changes in the outside air, so that temperature changes in the housing 41 are less likely to affect the output characteristic of the deuterium lamp 40, thereby enabling the deuterium lamp 10 to maintain its stable operational characteristic for a long period of time in combination with the above-mentioned double shield structure. This realizes a highly versatile apparatus which is independent of environments of use either outdoors or indoors. For example, it is applicable to spectrophotometers for outdoor water examinations, periodical inspections of chemical substances at sites of factories and plants, and the like.

A sheet-like vibration insulating member 66 made of rubber is disposed between the heat insulating member 65 and the bottom faceplate 41a of the housing 41. The vibration insulating member 66, heat insulating member 65, and lamp box 42 are secured to the bottom faceplate 41a of the housing 41 by four screws 67. In this case, each screw 67 is inserted from below the bottom faceplate 41a so as to be threaded into its corresponding screw hole 68 (see FIG. 9) in the lamp box 42. When the vibration insulating member 66 is employed as such, the vibration received by the housing 41 from the outside is harder to be transmitted to the lamp box 42, so that the deuterium lamp 10 is appropriately prevented from vibrating, whereby its output characteristic is stabilized.

Means for securely emitting the ultraviolet rays generated from the deuterium lamp 10 will now be explained.

Figure 12:
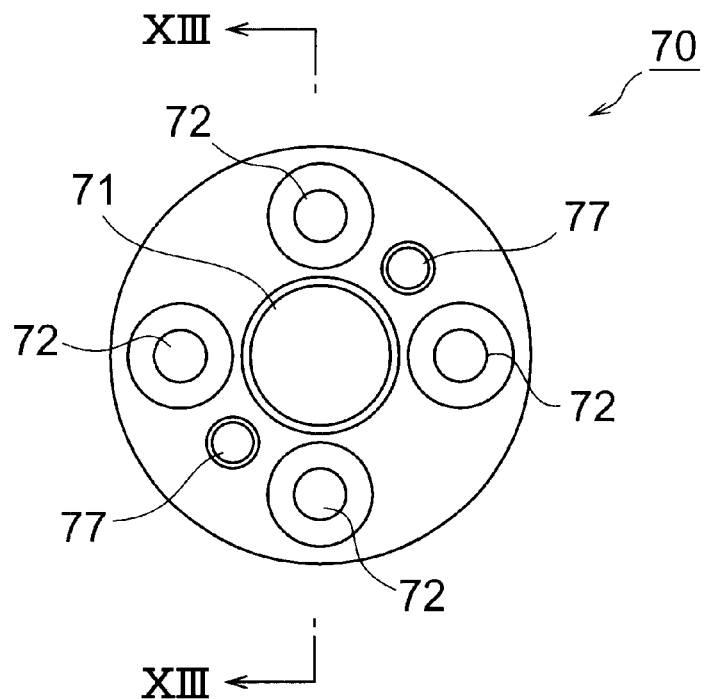
FIG. 12 is a front view showing a light guide tube.
Figure 13:
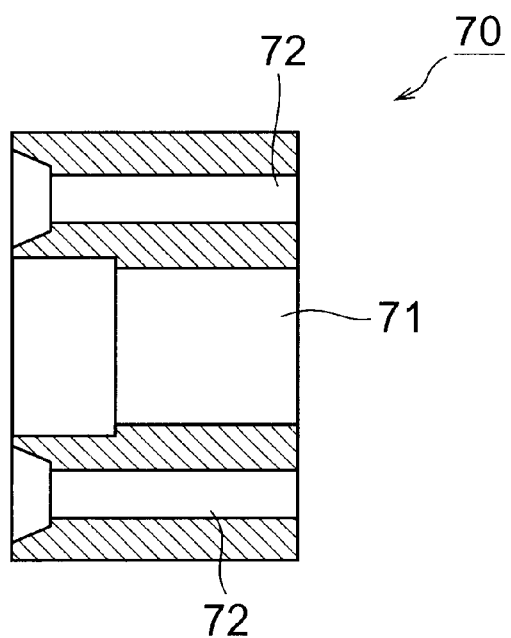
FIG. 13 is a sectional view taken along the line XIII—XIII of FIG. 12.

As shown in FIG. 6, the front wall 42a of the lamp box 42 is formed with a light exit opening 69 which penetrates therethrough and opposes the opening window 30 for projecting ultraviolet rays. Further, an aluminum-made light guide tube 70 for extending the light exit opening 69 is secured to the front wall 42a of the lamp box 42 so as to project forward. As shown in FIGS. 12 and 13, an extended opening 71 disposed concentric with the light emission opening 69 is formed at the center of the light guide tube 70, so as to pass ultraviolet rays therethrough. The light guide tube 70 is secured to the lamp box 42 by four screws 73. Specifically, the light guide tube 70 is secured to the lamp box 42 by the screws 73 through four screw insertion holes 72 disposed about the extended opening 71, respectively.

Such a light guide tube 70 is employed because it has been known that ozone is generated when ultraviolet rays are emitted in the air and, consequently, the ultraviolet rays should be kept from coming into contact with the air as much as possible. Namely, since a forcible flow of air is generated within the housing 41 by the cooling fan 43, the air is always kept on being newly supplied to a part where ultraviolet rays pass, so that a large amount of ozone is generated, by which ozone fluctuations may occur in the ultraviolet rays.

Therefore, the light guide tube 70 surrounds the region through which the ultraviolet rays pass, and is extended to the front faceplate 41d, so that cooling winds are kept from colliding with the ultraviolet rays as much as possible. Hence, when such a light guide tube 70 is employed, ozone is restrained from occurring in the part through which the ultraviolet rays pass within the housing 41, whereby the emitted light is appropriately kept from fluctuating due to the occurrence of ozone.

Figure 14:
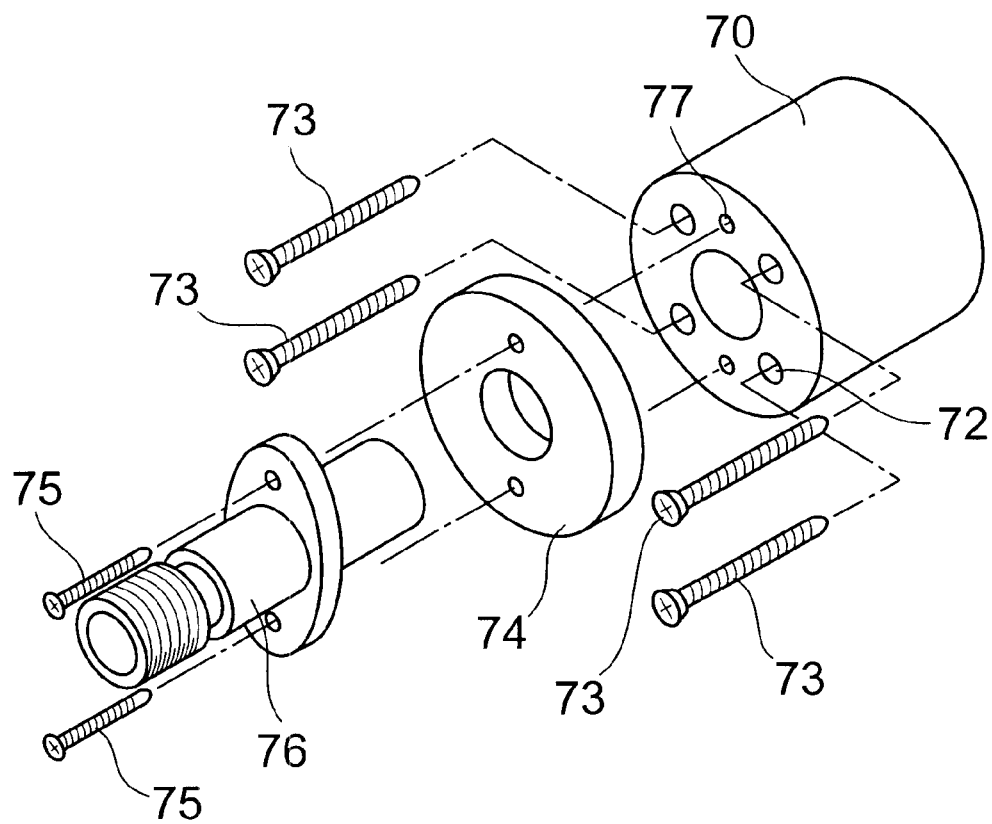
FIG. 14 is an exploded perspective view of the light guide tube, a heat insulating plate, and an adapter.
Figure 15:
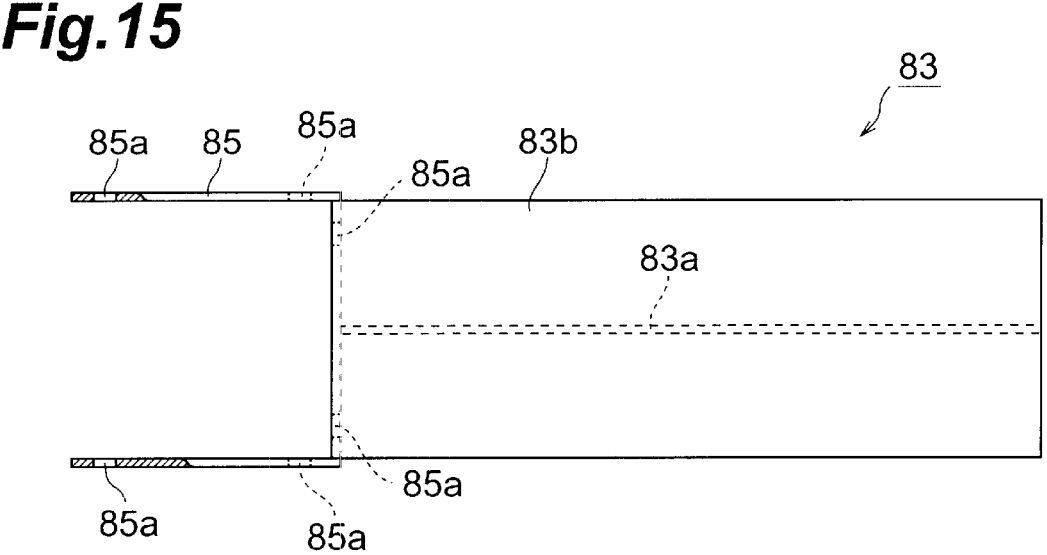
FIG. 15 is a plan view showing a radiation fin.
Figure 16:
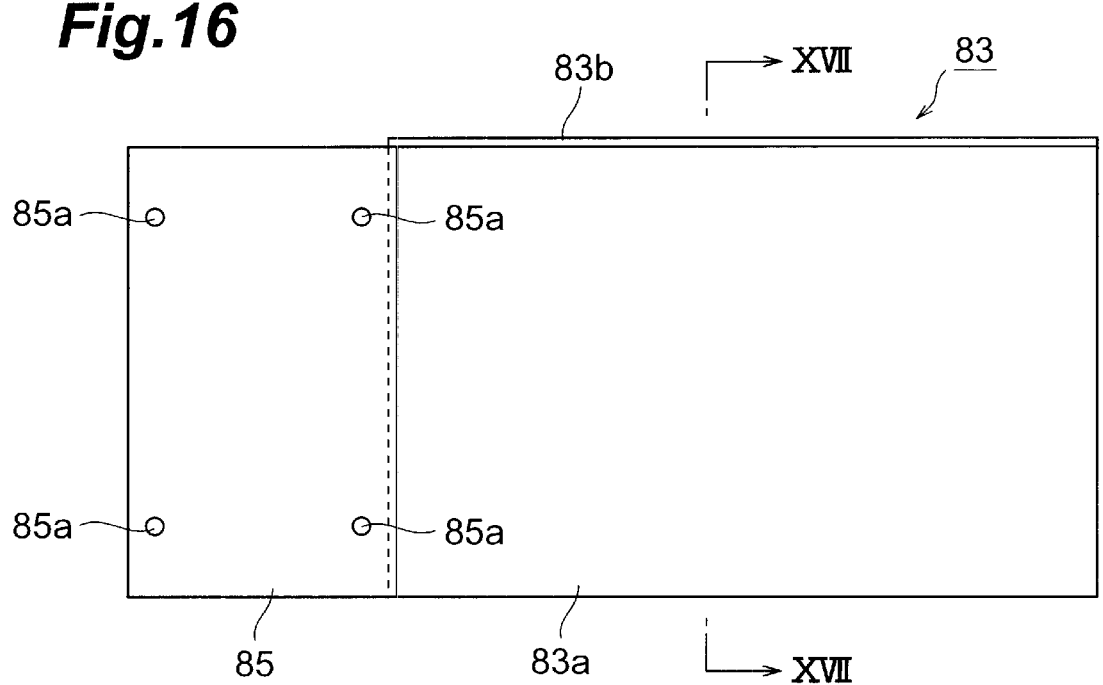
FIG. 16 is a side view showing the radiation fin.
Figure 17:
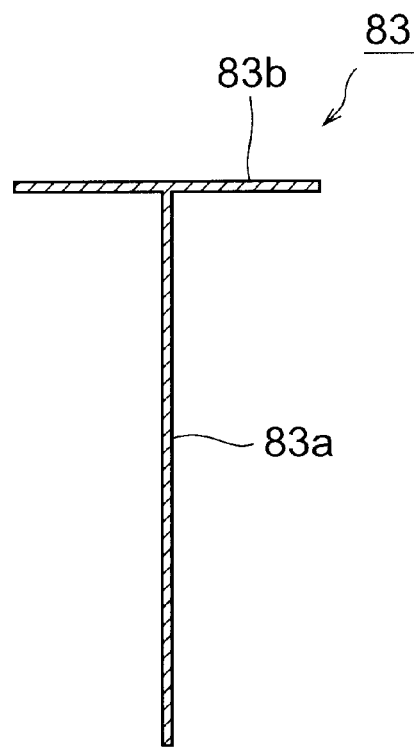
FIG. 17 is a sectional view taken along the line XVII—XVII of FIG. 16.
Figure 18:
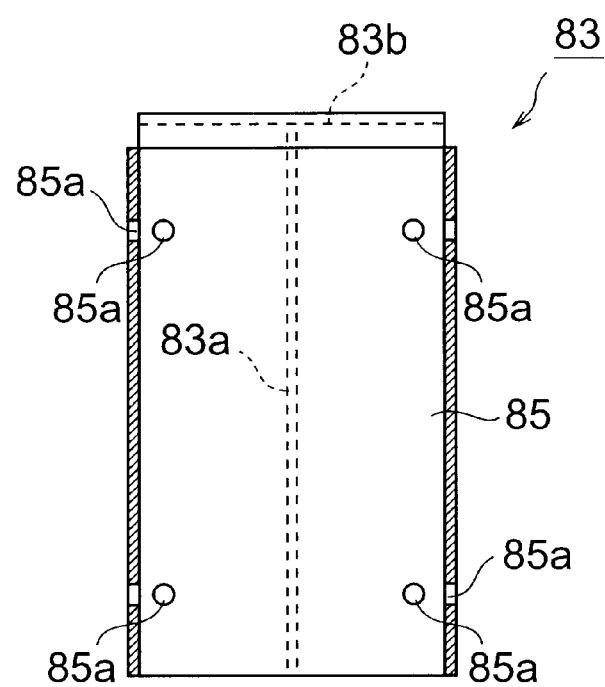
FIG. 18 is a front view showing the radiation fin.

Since the light guide tube 70 is extended to the vicinity of the front faceplate 41d, the light guide tube 70 approaches the housing 41, whereby thermal fluctuations of the housing 41 are transmitted to the lamp box 42 by way of the light guide tube 70. Therefore, a disk-shaped heat insulating member (second heat insulating plate) 74 made of ceramics is secured to the leading end face of the light guide tube 70. As shown in FIG. 14, the heat insulating member 74 is secured to the light guide tube 70 by two screws 75. When such a heat insulating member 74 is employed, the light guide tube 70 can be placed as close as possible to the housing 41.

The rear end of an adapter 76 for an optical connector is inserted into the extended opening 71 of the light guide tube 70 from the front end side thereof. The front end of the adapter is exposed from the front faceplate 41d of the housing 41. As a result, the adapter 76 makes it easier to connect with an optical fiber, which is not depicted, in the outside of the housing 41. Also, in cooperation with the light guide tube 70, a structure in which the ultraviolet rays are very hard to be affected by cooling winds is attained within the housing 41, whereby the optical output characteristic can be stabilized quite highly.

The adapter 76 is provided with a flange part 76a, whereas the light guide tube 70 is formed with two screw holes 77. Therefore, the heat insulating member 74 is secured to the light guide tube 70 together with the adapter 76 by the above-mentioned two screws 75.

Here, as shown in FIG. 6, a condenser lens 80 is secured within the light exit opening 69 of the lamp box 42. The condenser lens 80 is disposed close to the deuterium lamp 10, so that it can collect a greater amount of light, whereby the light intensity increases. The condenser lens 80 is held and secured between the light guide tube 70 and the lamp box 42 by way of a washer 81. Such a configuration makes it easier to mount the condenser lens 80 matching the output of the deuterium lamp, thereby enhancing the efficiency in operations and the degree of freedom in choosing condenser lenses 80.

For integrating the light guide tube 70 and the condenser lens 80 together, the condenser lens 80 may be secured within the extended opening 71 of the light guide tube 70. In this case, the condenser lens 80 attains a state where it is built in the light guide tube 70 beforehand, whereby the workability of assembling further improves.

Means for stabilizing the flow of air within the housing 41 so as to improve the cooling efficiency will now be explained. Within the housing 41, as shown in FIGS. 4 and 5, a radiation fin 83 having a T-shaped cross section extends between the lamp box 42 and the cooling fan 43. The radiation fin 83 is formed from an aluminum material.

The radiation fin 83 is secured to the lamp box 42 and extends to the vicinity of the cooling fan 43 while being slightly separated from the bottom faceplate 41a so as not to come into contact with the housing 41. The rear end of the radiation fin 83 opposes the cooling fan 43. Therefore, when a cooling wind occurs along the radiation fin 83, it is rapidly discharged to the outside by the cooling fan 43, so that the air exchange efficiency within the housing 41 increases, thereby making it possible to shorten the time of warming up required for stabilizing the output when actuating the lamp.

As shown in FIGS. 15 to 18, the radiation fin 83 has a partition 83a extending perpendicularly to the bottom faceplate 41a of the housing 41 between the lamp box 42 and the cooling fan 43, and a roof plate 41b disposed in the upper part of the partition 83a so as to extend in a direction orthogonal to the partition 83a (parallel to the bottom faceplate 41a). The front end of the radiation fin 83 is in contact with the lamp box 42, whereas the other end is positioned near the cooling fan 43. Since the radiation fin 83 is formed so as to have a T-shaped cross section as such, cooling winds flow so as to be suppressed by the roof plate 41b from therebelow, whereby they are less likely to reach the upper faceplate 41e of the housing 41 and the upper lid 62 and can be discharged efficiently and speedily.

Though the cooling winds are warmed by the heat exchange occurring on the surface of the lamp box 42 and thus are drawn by the cooling fan 43 while rising, they are efficiently exhausted along a passage having an L-shaped cross section formed by the partition 83a and roof plate 83b. For enhancing the efficiency of exhausting the cooling winds, the bottom faceplate 41a of the housing 41 is formed with a plurality of intake holes 84 positioned on both sides of the partition 83a, whereas each set of the intake holes 84 are arranged in a row along the partition 83a (see FIG. 5). As a result, the air is aspirated in close proximity of the radiation fin 83 from therebelow, whereby the cooling winds can efficiently be guided to the cooling fan 43 along the radiation fin 83.

Further, the front end of the radiation fin 83 is integrally provided with a radiator 85 having a rectangular U-shaped cross section adapted to abut against the outer surface of the lamp box 42, which enhances the thermal conduction efficiency between the lamp box 42 and the radiation fin 83. Therefore, the heat radiating area of the lamp box 42 is enlarged, whereby the cooling efficiency of the lamp box 42 is enhanced. Further, for securing the radiation fin 83 to the lamp box 42, the radiator 85 is formed with screw insertion holes 85a, whereas the lamp box 42 is formed with screw holes 87 (see FIG. 11). After the screw insertion holes 85a and the screw holes 87 are positioned with respect to each other, the radiator 85 is attached to the lamp box 42 by screws 86 (see FIG. 5).

Since the roof plate 83b is positioned near the upper lid 62 as shown in FIGS. 4 and 5, an interlock mechanism 90 can be attached to the roof plate 83b. The interlock mechanism 90 is a fail-safe mechanism for turning the power OFF when the upper lid 62 is removed.

Since the portable light source apparatus in accordance with the present invention is configured as explained in the foregoing, it yields the following effects. Namely, since it comprises a lamp box, secured within a housing, accommodating a deuterium lamp for generating a predetermined wavelength of light, and having a light exit opening for letting out the light emitted from the deuterium lamp; a power unit, secured within the housing, for driving the deuterium lamp; a cooling fan, secured to the housing, for generating a forcible flow of air within the housing; and a light guide tube secured to the lamp box so as to extend the light exit opening of the lamp box; it is less susceptible to temperature changes in the outside air and yields a very high stability of output.

What is claimed is:

1. A portable light source apparatus comprising:
   a lamp box, secured within a housing, accommodating a deuterium lamp for generating a predetermined wavelength of light, and having a light exit opening for letting out the light emitted from said deuterium lamp;
   a power unit, secured within said housing, for driving said deuterium lamp;
   a cooling fan, secured to said housing, for generating a forcible air flow within said housing; and
   a light guide tube secured to said lamp box so as to extend said light exit opening of said lamp box.

2. A portable light source apparatus according to claim 1, wherein a condenser lens is disposed within said light exit opening of said lamp box.

3. A portable light source apparatus according to claim 2, wherein said condenser lens is held and secured between said light guide tube and said lamp box.

4. A portable light source apparatus according to claim 2, wherein said condenser lens is disposed within said extended opening of said light guide tube.

5. A portable light source apparatus according to claim 1, wherein the rear end of an adapter for an optical connector is inserted into said extended opening of said light guide tube from the front end side thereof such that the front end of said adapter is exposed from said housing.

6. A portable light source apparatus according to claim 1, further comprising a heat insulating member inserted between an inner surface of said housing and said lamp box.

7. A portable light source apparatus according to claim 6, wherein said heat insulating member has a sheet-like heat insulating member and the inner surface is a surface of a bottom faceplate of said housing.

8. A portable light source apparatus according to claim 7, further comprising a vibration insulating member disposed between said heat insulating member and said inner surface of the housing.

9. A portable light source apparatus according to claim 1, further comprising a heat insulating member secured to a leading end face of said light guide tube.

10. A portable light source apparatus according to claim 1, wherein said housing has air intake holes on its wall, and wherein said power unit is arranged between this air intake holes and said cooling fan.

11. A portable light source apparatus according to claim 10, wherein said air intake holes are arranged on left and right side walls of said housing.

12. A portable light source apparatus according to claim 10, wherein said holes are laterally symmetrical to each other about a line connecting said lamp box and said cooling fan.

13. A portable light source apparatus according to claim 1, further comprising a radiation fin extending in a space between said lamp box and said cooling fan.

14. A portable light source apparatus according to claim 13, wherein said radiation fin has a partition and a roof plate, wherein said partition extends in a space between said lamp box and said cooling fan, wherein said roof plate is provided on the top of said partition, and wherein said radiation fin has a T-shaped cross-section when cutting said radiation fin by a plane normal to a line connecting between said lamp box and said cooling fan.

15. A portable light source apparatus according to claim 13, wherein said radiation fin is in contact with said lamp box.

16. A portable light source apparatus according to claim 13, wherein said radiation fin is arranged in front of said cooling fan.

* * * * *